United States Patent
Shimizu et al.

(10) Patent No.: US 12,386,023 B2
(45) Date of Patent: Aug. 12, 2025

(54) DETECTION DEVICE AND DETECTION METHOD

(71) Applicant: YOKOGAWA ELECTRIC CORPORATION, Tokyo (JP)

(72) Inventors: Yoshifumi Shimizu, Tokyo (JP); Takashi Yoshiura, Tokyo (JP); Kohki Nishide, Tokyo (JP); Yasunori Yokoyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 249 days.

(21) Appl. No.: 17/864,874

(22) Filed: Jul. 14, 2022

(65) Prior Publication Data

US 2023/0027738 A1   Jan. 26, 2023

(30) Foreign Application Priority Data

Jul. 20, 2021   (JP) .................................. 2021-119599

(51) Int. Cl.
*G01N 35/10* (2006.01)
*G01S 5/16* (2006.01)

(52) U.S. Cl.
CPC ............ *G01S 5/16* (2013.01); *G01N 35/1011* (2013.01); *G01N 2035/1013* (2013.01)

(58) Field of Classification Search
CPC ...... G01S 5/16; G01V 8/20; G01N 35/00693; G01N 2035/1013; G01N 35/1011;
(Continued)

(56) References Cited

U.S. PATENT DOCUMENTS 4,888,710 A * 12/1989 Venthem .................. G01D 9/40
                                                            358/1.6
2004/0208795 A1* 10/2004 Toi ....................... G01N 35/1011
                                                            422/400
(Continued)

FOREIGN PATENT DOCUMENTS

| EP | 1489425 A1 | 12/2004 |
|----|------------|---------|
| JP | 6090387 B2 | 3/2017 |

(Continued)

OTHER PUBLICATIONS

English translation of WO2019/166548 (Year: 2019).*
(Continued)

*Primary Examiner* — Christina A Riddle
(74) *Attorney, Agent, or Firm* — RANKIN, HILL & CLARK LLP

(57) ABSTRACT

A detection device detects a position of a leading end of a tip for executing an operation on a cell via the leading end. The detection device includes a light source that outputs light in a lateral direction such that the light has a width when viewed along an up-and-down direction, a movement mechanism that moves the tip, and a detector that detects the light output from the light source, wherein the light output from the light source until being detected by the detector includes first and second lights that advance in respectively different lateral directions, the movement mechanism moves the tip such that a part of the first light and a part of the second light are blocked by the leading end, and the detector detects the first and second lights whose parts are blocked by the leading end.

15 Claims, 13 Drawing Sheets

(58) Field of Classification Search
CPC ...... G06T 7/0008; B01L 3/021; B01L 3/0217;
B01L 3/022; B01L 3/0224; B01L 3/0227;
B01L 3/0231; B01L 3/0234; B01L
3/0237; B23Q 17/00; B23Q 17/008;
B23Q 17/0995; B23Q 17/0909; B23Q
17/0904; B23Q 17/0914; B23Q 17/0947;
B23Q 17/0919; B23Q 17/0957; B23Q
17/2208; B23Q 17/2241; B23Q 17/2266;
B23Q 17/2275; B23Q 17/22; B23Q
17/24; B23Q 17/2404; B23Q 17/2409;
B23Q 17/2414; B23Q 17/2423; B23Q
17/2419; B23Q 17/2433; B23Q 17/2442;
B23Q 17/2457; B23Q 17/2461; B23Q
17/2466; B23Q 17/248; B23Q 17/2485;
B23Q 17/249; B23Q 17/2495; H04N
23/52; H04N 23/56; H04N 23/71; H04N
23/72
USPC ............ 356/614–624, 388–398, 256, 72, 73;
700/245; 73/864.24, 864.25, 863.01,
73/863.32, 863.31, 864.11, 1.74, 1.79,
73/290 R, 61.53, 864.16, 864.21, 304 C;
33/707
See application file for complete search history.

(56) References Cited

U.S. PATENT DOCUMENTS

| 2004/0267405 | A1 | 12/2004 | Ingenhoven et al. |
| 2017/0227564 | A1* | 8/2017 | Muschler ........... G01B 11/0608 |
| 2020/0376672 | A1 | 12/2020 | Wolf et al. |

FOREIGN PATENT DOCUMENTS

| JP | 2020-201245 A | 12/2020 |
| WO | 2019/166548 A1 | 9/2019 |

OTHER PUBLICATIONS

Japanese Office Action (JPOA) dated Aug. 29, 2023 for Japanese Patent Application No. 2021-119599; English machine translation.
Extended European Search Report (EESR) dated Jan. 3, 2023 for European Patent Application No. 22185196.7.

* cited by examiner

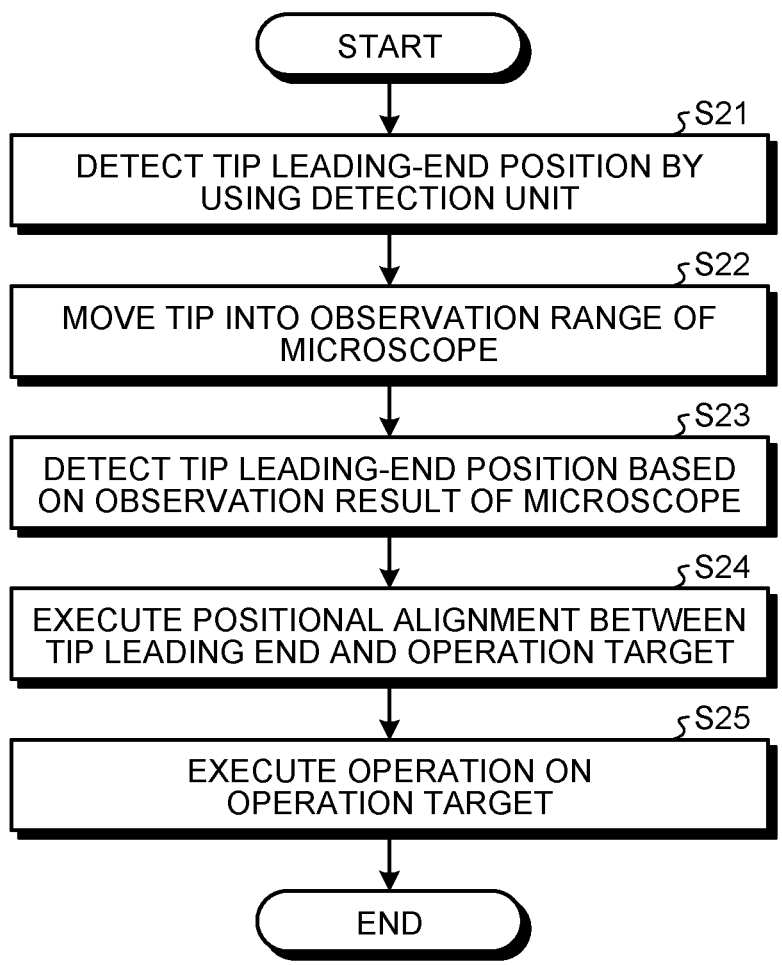

DETECTION DEVICE AND DETECTION METHOD

CROSS-REFERENCE TO RELATED APPLICATION(S)

The present application claims priority to and incorporates by reference the entire contents of Japanese Patent Application No. 2021-119599 filed in Japan on Jul. 20, 2021.

FIELD

Exemplary embodiments disclosed herein relate to a detection device and a detection method.

BACKGROUND

In research of a life system and the like, operations such as aspiration of a cell or an intracellular material are executed via a leading end of a tip for operation (see Japanese Patent No. 6090387, for example).

It is important to grasp a tip leading-end position in order to perform aspiration on a cell sample and the like at a precise position. The tip is generally manufactured by pulling glass, and thus a tip leading-end position fluctuates. Thus, there is needed positional detection in a wide range in consideration of the fluctuation. In this point, Japanese Patent No. 6090387 does not specifically discuss the matter.

One aspect of the present disclosure is made in view of the aforementioned, and an object of the present disclosure is to detect a tip leading-end position in a wide range.

SUMMARY

According to one aspect of embodiments, a detection device is provided. The detection device detects a position of a leading end of a tip for executing an operation on a cell via the leading end, the tip including the leading end in a lower portion thereof. The detection device includes a light source that outputs light in a lateral direction such that the light has a width when viewed along an up-and-down direction, a movement mechanism that moves the tip, and a detector that detects the light output from the light source, wherein the light output from the light source until being detected by the detector includes first light and second light that advance in respective lateral directions that are different from each other, the movement mechanism moves the tip such that a part of the first light and a part of the second light are blocked by the leading end, and the detector detects the first light and the second light whose parts are blocked by the leading end.

According to one aspect of embodiments, a detection method is provided. The detection method detects a position of a leading end of a tip for executing an operation on a cell via the leading end, the tip including the leading end in a lower portion thereof. The detection method includes outputting light in a lateral direction such that the light has a width when viewed along an up-and-down direction, moving the tip, and detecting the output light, wherein light from the outputting until the detecting includes first light and second light that advance in respective lateral directions that are different from each other, the moving includes moving the tip such that a part of the first light and a part of the second light are blocked by the leading end, and the detecting includes detecting the first light and the second light whose parts are blocked by the leading end.

BRIEF DESCRIPTION OF THE DRAWINGS

FIG. 13 is a flowchart illustrating examples of processes (detection method, cell operating method) to be executed in the cell operating system.

DESCRIPTION OF EMBODIMENTS

Hereinafter, embodiments will be described in detail with reference to the accompanying drawings. The same elements are provided with the respective same reference symbols, and duplicated explanation is appropriately omitted.

<Preface>

In research of a life system and the like, there are frequently executed operations such as aspiration of a characteristic cell among a lot of cells in a cell culture container or an intracellular material thereof. For example, in a research example of metabolism in a cell with respect to a drug, an intracellular material is aspirated from a specific portion of the cell after working of the drug on the cell, and analysis such as a mass analysis is executed to evaluate how much drug remains in which portion of the cell, for example. Hereinafter, a cell, an intracellular material, and the like, which are to be operated may be simply referred to as an "operation target".

In the operation, an operation tip is used. The tip is attached to a device or the like so as to extend in the up-and-down direction. The operation is performed in a state where a lower leading end of the tip is positioned at an operation target. A length (for example, diameter) of a tip leading end in a lateral direction (direction intersecting with up-and-down direction) is approximately 0.1 µm to a few hundreds µm. It is important to grasp a tip leading-end position, and thus detection of the tip leading-end position is necessary. A tip leading-end position fluctuates due to fluctuation in manufacturing and/or attaching of a tip. A fluctuation range of a tip leading-end position in the lateral direction reaches as much as 100 μm to 1000 μm, for example. Thus, there is desired a wide-range positional detection in consideration of the fluctuation.

First Embodiment

Figure 1:
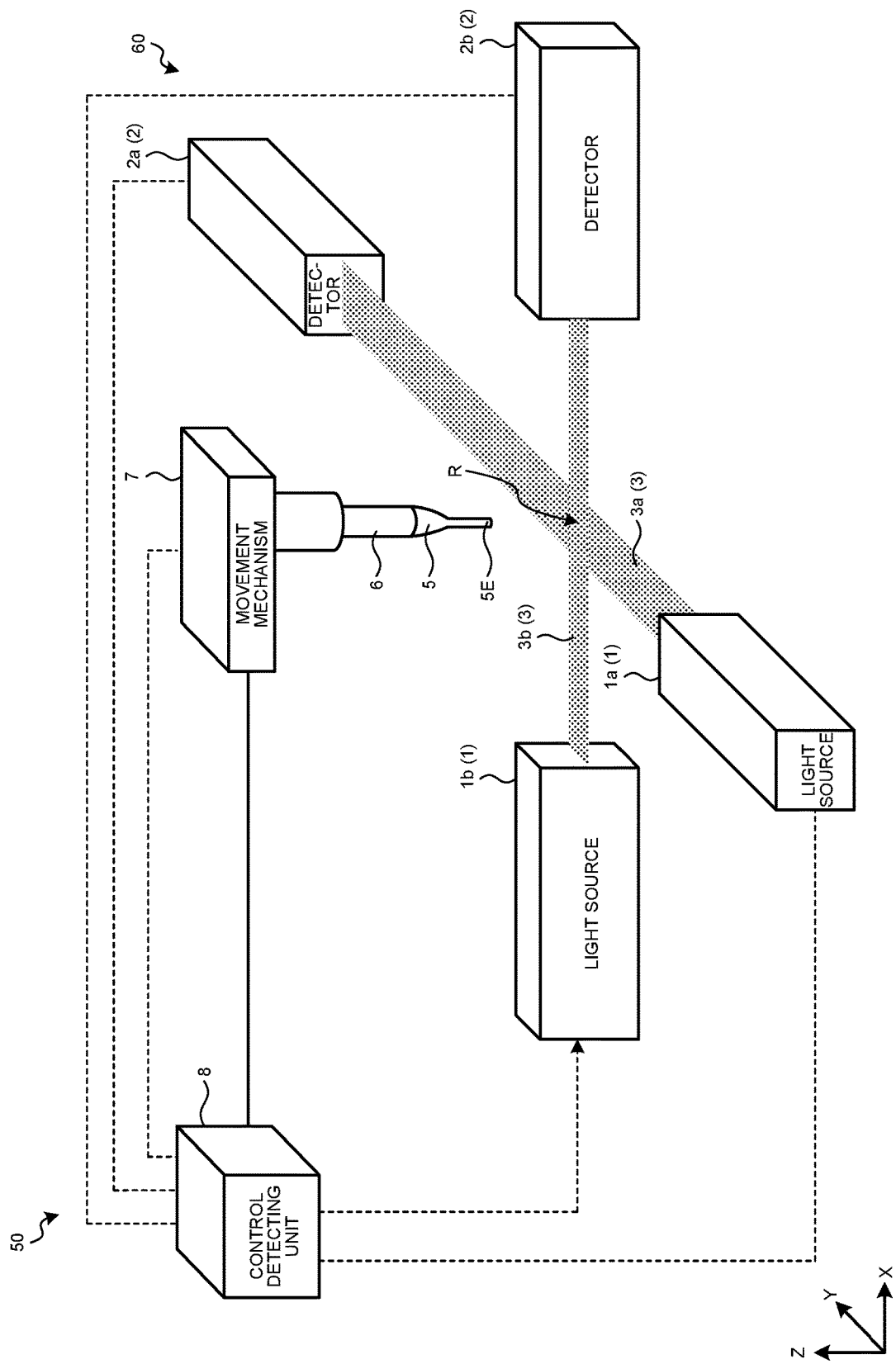
FIG. 1 is a diagram illustrating a schematic configuration example of a detection device according to a first embodiment.

FIG. 1 is a diagram illustrating a schematic configuration example of a detection device according to a first embodiment. A detection device 50 includes a detection unit 60, a cell operating unit 6 in which a tip 5 is provided, a movement mechanism 7, and a control detecting unit 8. In FIG. 1, an XYZ-coordinate is indicated. A Z-axis direction corresponds to an extending direction of the tip 5, in other words, an up-and-down direction. An X-axis direction and a Y-axis direction correspond to a lateral direction. The up-and-down direction may be the vertical direction, and in this case, the lateral direction is the horizontal direction.

The tip 5 is a tip described at the beginning. The tip 5 is attached to the cell operating unit 6 so as to extend in the up-and-down direction. The tip 5 includes a leading end 5E in a lower portion thereof (Z-axis positive direction). An operation target is operated via the leading end 5E. The detection device 50 is used for detecting a position of the leading end 5E. Hereinafter, a position of the leading end 5E may be referred to as a "tip leading-end position".

For example, in a case where an operation is an aspiration operation, an operation target is aspirated via the leading end 5E. The tip 5 functions as an aspiration tip, the cell operating unit 6 functions as an aspirator (dispenser). Other examples of the operations are drug infusion, sensing, and the like. Drug is infused into an operation target via the leading end 5E. In sensing, a state of an operation target is monitored by using a sensor provided in the leading end 5E and the like, for example.

The detection unit 60 includes a light source 1 and a detector 2. The light source 1 outputs light advancing in the lateral direction. Light output from the light source 1 may be referred to and illustrated as light 3. An example of the light 3 is laser light. The light source 1 is configured to include a Laser Diode (LD), for example. The light source 1 outputs the light 3 such that the light 3 has a width viewed along the up-and-down direction (viewed along Z-axis direction). The above-mentioned "outputting light such that the light has a width" has meaning that includes not only simultaneously outputting light (for example, light beam) having the width, but also executing scanning and outputting narrower light within a range of the width.

In the example illustrated in FIG. 1, the light 3 is a parallel light beam having a belt-like shape (rectangular-shaped, line-shaped, or the like). For example, the light 3 that is formed in a belt-like shape by a not-illustrated optical system in the light source 1 or the like is output from the light source 1. A width of the light 3 is larger than a fluctuation width of a tip leading-end position in the lateral direction, and is approximately 1 mm to a few tens mm, for example.

The light 3 also has a certain width (length in Z-axis direction) in the up-and-down direction. The width may be referred to as an up-and-down width. It is sufficient that the up-and-down width having a belt-like shape is not so large, and may be approximately a few μm to 100 μm.

The detector 2 detects the light 3 output from the light source 1. The detector 2 detects a light intensity (received light amount and the like) in a width direction of the light 3. The detector 2 is configured to include a light receiving element. One example of the light receiving element is a Photo Diode (PD). The light receiving element may be a plurality of light receiving elements (one-dimensional sensor array) that is arrayed along the width direction of the light 3. A light intensity at a position of each light receiving element is detected. Whole length of the array is approximately equal to a width of the light 3. An arrangement interval of the light receiving elements is approximately a few μm to a few ten μm, for example. The narrower the arrangement interval is, the higher the resolution of the light detection is.

The light 3 output from the light source 1 until being detected by the detector 2 includes light 3a (first light) and light 3b (second light) advancing in lateral directions that are different from each other. Each of a width of the light 3a and a width of the light 3b is larger than a fluctuation width of a tip leading-end position in the lateral direction.

In the first embodiment, the detection unit 60 includes the two light sources 1 and the two detectors 2. In order to make difference between the light sources 1, the two light sources 1 may be referred to and illustrated as a light source 1a and a light source 1b. In order to make difference between the detectors 2, the two detectors 2 may be referred to and illustrated as a detector 2a and a detector 2b.

The light source 1a and the detector 2a are a first light source and a first detector that are arranged so as to oppose to each other in the Y-axis direction. The light source 1a outputs the light 3a toward the detector 2a. In the example, the light 3a advances in the Y-axis positive direction while having a width direction thereof in the X-axis direction. The detector 2a detects a distribution of light intensity in the width direction of the light 3a, in other words, the X-axis direction.

The light source 1b and the detector 2b are a second light source and a second detector that are arranged so as to oppose to each other in the X-axis direction. The light source 1b outputs the light 3b toward the detector 2b. In the example, the light 3b advances in the X-axis positive direction while having a width direction thereof in the Y-axis direction. The detector 2b detects a distribution of light intensity in the width direction of the light 3b, in other words, the Y-axis direction. The light source 1b outputs the light 3b such that the light 3b intersects with the light 3a. The intersection includes that a position of the light 3a and a position of the light 3b in the up-and-down direction are overlapped with each other.

A region through which at least one of the light 3a and the light 3b passes is set as a reference region R. Viewed along the up-and-down direction, the reference region R includes at least one region of a rectangular-shaped region at least one of whose side is corresponding to a width of the light 3a and a rectangular-shaped region at least one of whose side is corresponding to a width of the light 3b.

In the first embodiment, a region in which the light 3a and the light 3b intersect with each other is set to the reference region R. As described above, widths of the light 3a and the light 3b are larger than respective fluctuation widths of a tip leading-end position in directions thereof. The reference region R has a spread that covers at least a fluctuation width of a tip leading-end position in the X-Y plane direction.

The movement mechanism 7 moves the cell operating unit 6 so as to move the tip 5. The movement includes movement in the X-axis direction, movement in the Y-axis direction, and movement in the Z-axis direction. The movement mechanism 7 is configured to include, for example, an actuator and the like.

The control detecting unit 8 controls elements in the detection device 50 so as to execute overall control on the detection device 50. The control is executed by using a control signal and the like. Signal lines for performing transmission and reception of control signals and the like are schematically illustrated by using dashed lines. For example, the control detecting unit 8 controls the movement mechanism 7 so as to move the tip 5. The control detecting unit 8 detects a tip leading-end position on the basis of detection result of the detector 2. Detection of a tip leading-end position will be explained additionally with reference to FIG. 2.

Figure 2:
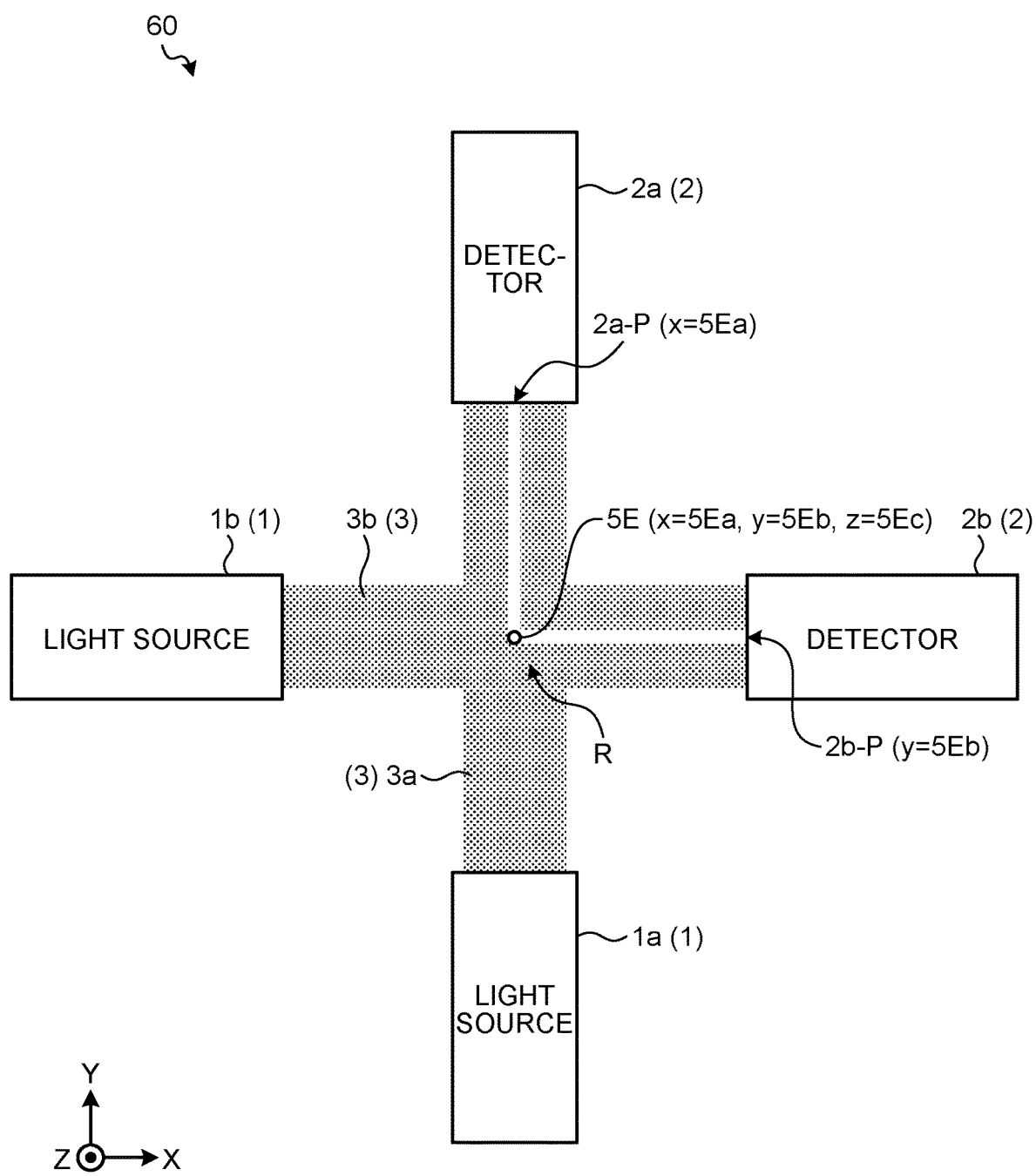
FIG. 2 is a diagram illustrating an example of detection of a tip leading-end position.

FIG. 2 is a diagram illustrating an example of detection of a tip leading-end position. The detection unit 60 and the leading end 5E are schematically illustrated when viewed downward (viewed along Z-axis negative direction). The leading end 5E is positioned in the reference region R. Parts of the light 3a and the light 3b are blocked by the leading end 5E.

The detector 2a detects the light 3a a part of which is blocked by the leading end 5E. In the detector 2a, a position where a light intensity decreases in the width direction of the light 3a, in other words, the X-axis direction is detected. The position is denoted and illustrated as a detection position 2a-P. Detection result of the detector 2a, more specifically, information (position on X-axis direction, light intensity, and the like) related to the detection position 2a-P is transmitted to the control detecting unit 8 from the detector 2a as a detection signal, for example.

The detector 2b detects the light 3b a part of which is blocked by the leading end 5E. In the detector 2b, a position where a light intensity decreases in the width direction of the light 3b, in other words, the Y-axis direction is detected. The position is denoted and illustrated as a detection position 2b-P. Detection result of the detector 2b, more specifically, information related to the detection position 2b-P is transmitted to the control detecting unit 8 from the detector 2b.

On the basis of detection result of the detector 2a, the control detecting unit 8 (see FIG. 1) detects that a part of the light 3a is blocked by the leading end 5E. Specifically, in a case where detection result of the detector 2a includes information on the detection position 2a-P, the control detecting unit 8 detects that a part of the light 3a is blocked by the leading end 5E. The control detecting unit 8 detects the detection position 2a-P as a tip leading-end position in the X-axis direction. The tip leading-end position in the X-axis direction, which is detected by the control detecting unit 8, is denoted and illustrated as a position 5Ea.

On the basis of detection result of the detector 2b, the control detecting unit 8 detects that a part of the light 3b is blocked by the leading end 5E. Specifically, in a case where the detection result of the detector 2b includes information on the detection position 2b-P, the control detecting unit 8 detects that a part of the light 3b is blocked by the leading end 5E. The control detecting unit 8 detects the detection position 2b-P as a tip leading-end position in the Y-axis direction. The tip leading-end position in the Y-axis direction, which is detected by the control detecting unit 8, is denoted and illustrated as a position 5Eb.

The control detecting unit 8 detects a position of the reference region R in the up-and-down direction in a case where the light 3a and/or the light 3b are blocked by the leading end 5E as a tip leading-end position in the up-and-down direction. The tip leading-end position in the up-and-down direction, which is detected by the control detecting unit 8, is denoted and illustrated as a position 5Ec.

The tip leading-end positions (position 5Ea, position 5Eb, and position 5Ec) detected by the control detecting unit 8 may be grasped by using, for example, a position in the detection device 50, more specifically, a coordinate in a device (for example, cell operating systems 70 illustrated in FIGS. 10 to 12 to be mentioned later and the like) including the detection device 50.

Figure 3:
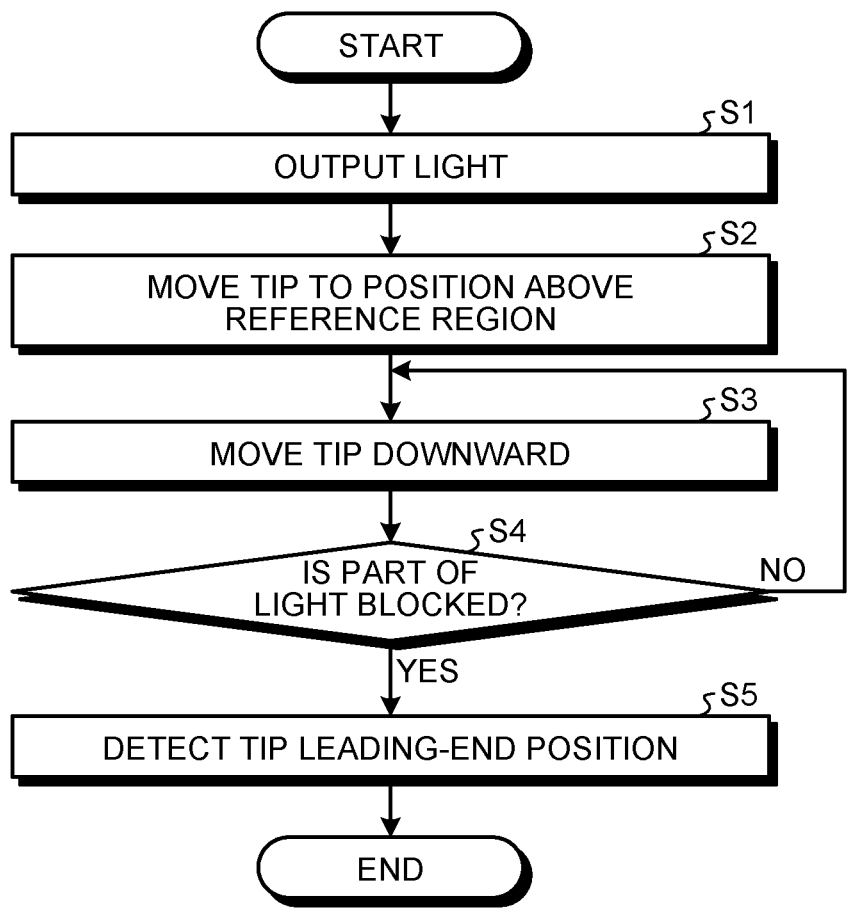
FIG. 3 is a flowchart illustrating an example of a process (detection method) to be executed in the detection device.

FIG. 3 is a flowchart illustrating an example of a process (detection method) to be executed in the detection device. Except for a case where explanation is especially given, the processes are executed under control and the like of the control detecting unit 8.

In Step S1, the detection device 50 outputs light. The light source 1a and the light source 1b output the light 3a and the light 3b, respectively. The detector 2a and the detector 2b detect the light 3a and the light 3b, respectively.

In Step S2, the detection device 50 moves a tip to a position above a reference region. For example, the movement mechanism 7 moves the tip 5 such that the cell operating unit 6 is at a position above the reference region R by a predetermined distance. The predetermined distance is approximately 1 mm, for example. The position is a reference position of the cell operating unit 6. In a state where the cell operating unit 6 is in a reference position, for example, when viewed along the up-and-down direction, a connection part (center portion of cell operating unit 6) between the cell operating unit 6 and the tip 5, and the center of the reference region R may be overlapped with each other.

Note that the order of the above-mentioned Step S1 and Step S2 may be reversed one.

In Step S3, the detection device 50 moves a tip downward. The movement mechanism 7 moves the tip 5 downward by a predetermined interval. An example of the predetermined interval is approximately 10 μm.

In Step S4, the detection device 50 determines whether or not a part of light is blocked. As described above, on the basis of detection result of the detector 2, if the fact that a part of the light 3a and a part of the light 3b are blocked by the leading end 5E is detected, the control detecting unit 8 determines that a part of the light is blocked. In a case where a part of light is blocked (Step S4: Yes), the processing is shifted to Step S5. Otherwise (Step S4: No), the processing returns to Step S3. The movement mechanism 7 does not quit downward movement of the tip 5 until the leading end 5E is in the reference region R and thus parts of the light 3a and the light 3b are blocked by the leading end 5E.

In Step S5, the detection device 50 detects a tip leading-end position. As described above, on the basis of detection result of the detector 2, the control detecting unit 8 detects a tip leading-end position. The detection position 2a-P in the detector 2a is detected as the position 5Ea. The detection position 2b-P in the detector 2b is detected as the position 5Eb. A position of the reference region R in the up-and-down direction is detected as the position 5Ec.

For example, as described above, a tip leading-end position in the reference region R is detected. The reference region R is a region including a fluctuation width of a tip leading-end position, and thus detection in a wide range (covering fluctuation range) in consideration of fluctuation is possible.

Modification of First Embodiment

Some modifications of the first embodiment will be explained. The light 3a and the light 3b may be output such that scanning is executed with the light 3a and the light 3b in width directions thereof. The widths of the light 3a and the light 3b in the above-mentioned case may be narrower than a fluctuation width of a tip leading-end position. The light 3a and the light 3b may be laser light whose luminous-flux diameter is approximately a few μm to 100 μm, for example. A light receiving element included in the detector 2 may be a single-type light receiving element, and in this case, the detector 2 and the like may be configured such that laser light is led by a condensing lens to a light receiving element.

An up-and-down width of the light 3a and an up-and-down width of the light 3b may be larger than a fluctuation width of a tip leading-end position in the up-and-down direction. The reference region R has spread also in the up-and-down direction. A tip leading-end position in the up-and-down direction (Z-axis direction) can be detected in accordance with a principle similar to that of detection of a tip leading-end position in the lateral direction (X-Y plane direction). An example of the up-and-down width is approximately 1 mm to a few mm. Each of the light 3a and the light 3b may be a rectangular-shaped parallel light beam or an ellipse-shaped parallel light beam. A light receiving element included in the detector 2 may be a plurality of light receiving elements (two-dimensional sensor array) that includes light-receptive sensors arrayed in the up-and-down direction. For example, the lowest position of a position in which a light intensity decreases in the up-and-down direction is detected as a tip leading-end position. A tip leading-end position can be detected even in a state where the tip 5 is gradually moved downward toward the reference region R as described in Step S2 in FIG. 3.

The above-mentioned modifications may be combined with each other. Each of the light 3a and the light 3b may be a parallel light beam in which scanning is executed with laser light whose luminous-flux diameter is approximately a few μm to 100 μm in a width direction thereof. A light receiving element included in the detector 2 may be a single-type light receiving element or a plurality of light receiving elements that is two-dimensionally arrayed.

Each of the light 3a and the light 3b is a parallel light beam having a belt-like shape, and scanning may be executed in the up-and-down direction. The above-mentioned two-dimensional sensor array may be employed. A one-dimensional sensor array combined with a cylindrical lens may be employed. The cylindrical lens is configured to lead the scanned light 3 to the one-dimensional sensor array.

In the aforementioned, the example has been explained in which the light 3a advances in the Y-axis positive direction, the light 3b advances in the X-axis positive direction, and the light 3a and the light 3b are perpendicular to each other. Note that a mode of intersection and advancing directions of the light 3a and the light 3b is not limited thereto. It is sufficient as long as the light 3a and the light 3b intersect with each other (it is sufficient as long as light 3a and light 3b are not parallel to each other).

Second Embodiment

Figure 4:
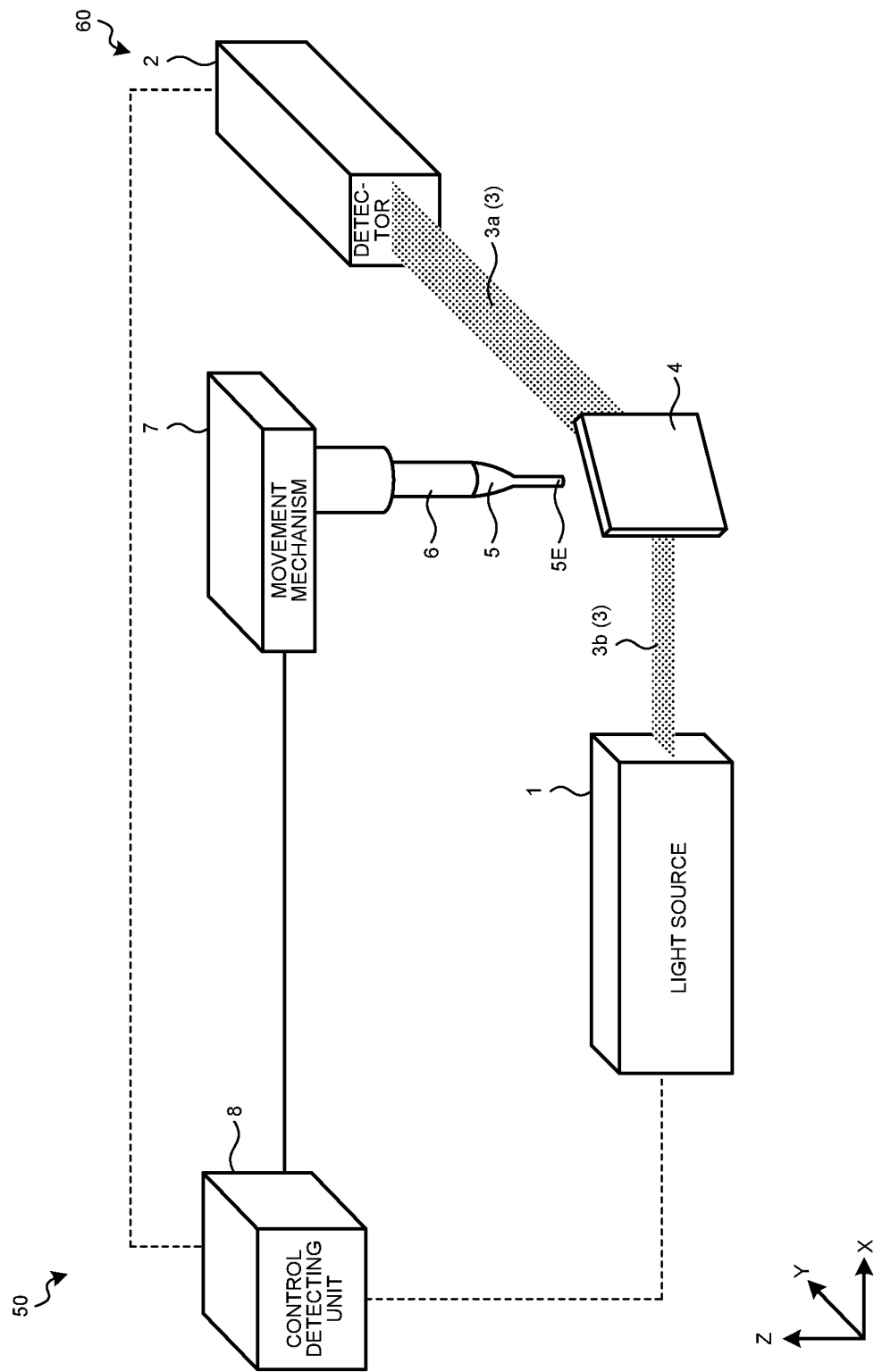
FIG. 4 is a diagram illustrating a schematic configuration example of a detection device according to a second embodiment.

FIG. 4 is a diagram illustrating a schematic configuration example of a detection device according to a second embodiment. Compared with the first embodiment, the second embodiment is particularly different in that the detection unit 60 includes the single light source 1a and the single detector 2, and further in that the detection unit 60 further includes a mirror 4. Explanation of duplicated contents with respect to the first embodiment are appropriately omitted.

The mirror 4 reflects the light 3 emitted from the light source 1 toward the detector 2. The mirror 4 is arranged on a light path of the light 3 from the light source 1 to the detector 2. The detector 2 detects the light 3 reflected by the mirror 4. One of the light 3a and the light 3b is light (light before reflection) advancing from the light source 1 to the mirror 4, and the other is light (light after reflection) advancing from the mirror 4 to the detector 2. In the present example, the light source 1 outputs the light 3 in the X-axis positive direction, and the mirror 4 reflect the light 3 emitted from the light source 1 in the Y-axis positive direction. The light 3a is light after reflection, and the light 3b is light before reflection. The control detecting unit 8 detects a tip leading-end position on the basis of detection result of the detector 2. The detection of a tip leading-end position will be explained with further reference to FIGS. 5 and 6.

Figure 5:
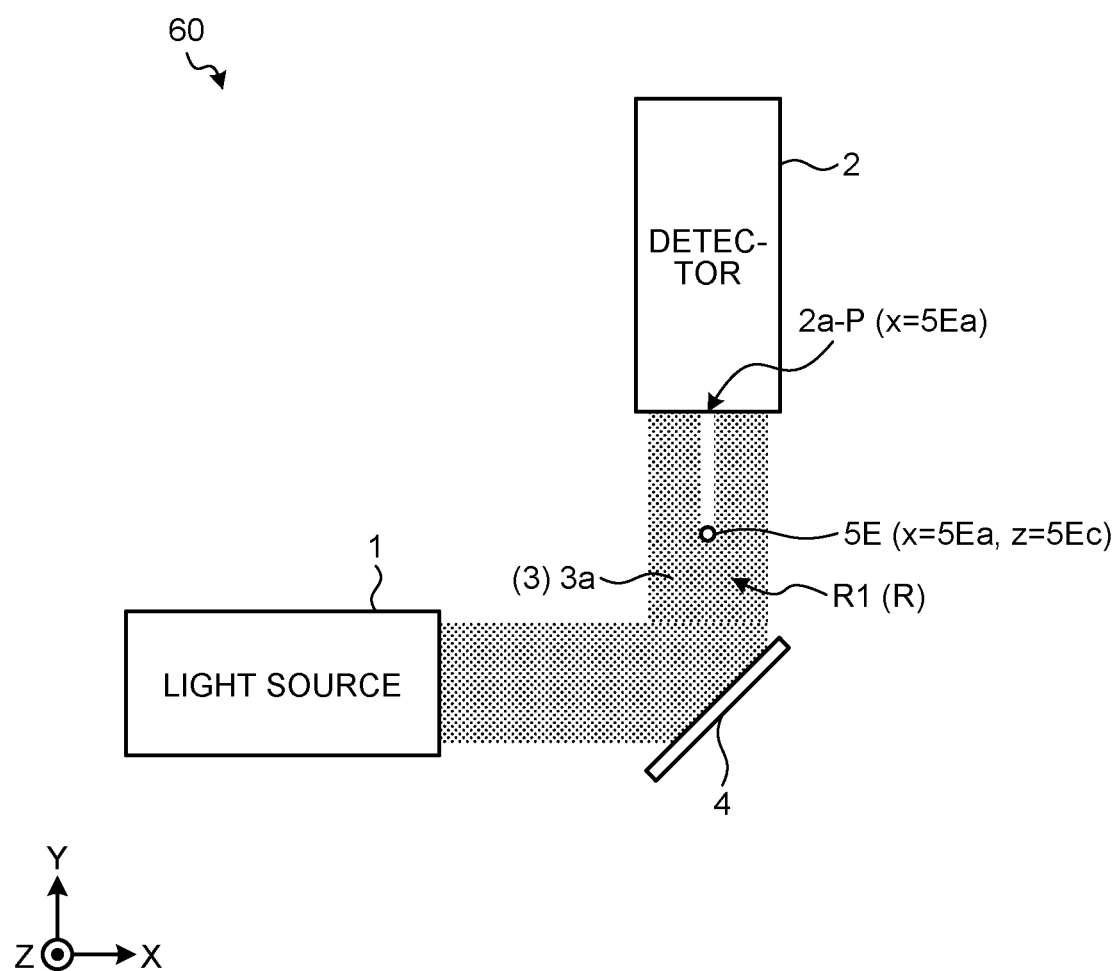
FIG. 5 is a diagram illustrating an example of detection of a tip leading-end position.
Figure 6:
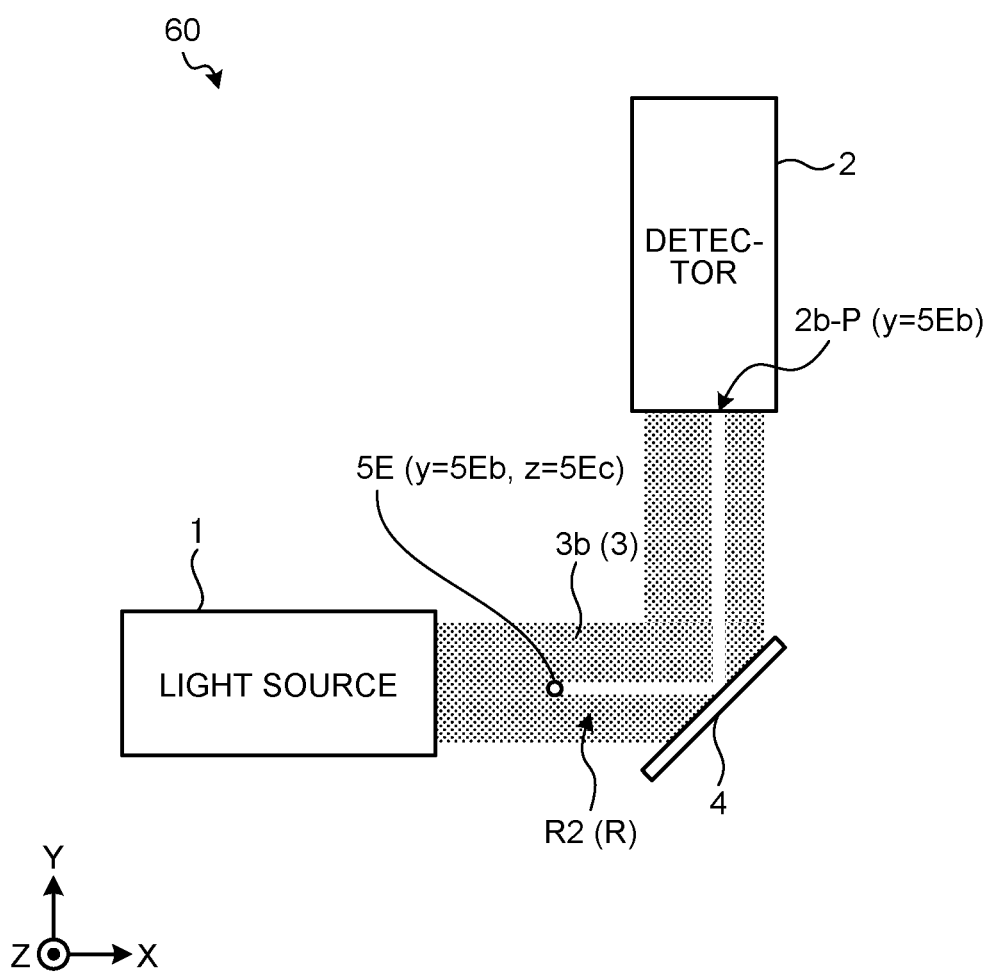
FIG. 6 is a diagram illustrating an example of detection of a tip leading-end position.

FIGS. 5 and 6 are diagrams illustrating one example of detection of a tip leading-end position. In the example, the reference region R includes a reference region R1 and a reference region R2. The reference region R1 is a first reference region that includes a rectangular-shaped region having at least one side corresponding to a width of the light 3a. The reference region R2 is a second reference region that includes a rectangular-shaped region having at least one side corresponding to a width of the light 3b.

The movement mechanism 7 moves the tip 5 such that the leading end 5E is positioned at respective different timings in the reference region R1 and the reference region R2. The detector 2 detects the light 3a a part of which is blocked by the leading end 5E and the light 3b a part of which is blocked by the leading end 5E at respective different timings.

In the example illustrated in FIG. 5, the leading end 5E is positioned in the reference region R1. A part of the light 3a is blocked by the leading end 5E. In the detector 2, a position in which a light intensity decreases in the width direction of the light 3a, in other words, the X-axis direction, is detected as the detection position 2a-P. Detection result is transmitted to the control detecting unit 8.

In the example illustrated in FIG. 6, the leading end 5E is positioned in the reference region R2. A part of the light 3b is blocked by the leading end 5E. In the detector 2, a position in which a light intensity decreases in the width direction of the light 3b, in other words, the Y-axis direction, is detected as the detection position 2b-P. Detection result is transmitted to the control detecting unit 8.

On the basis of detection result of the detector 2, the control detecting unit 8 (see FIG. 4) detects that a part of the light 3a and/or a part of the light 3b is blocked by the leading end 5E. The control detecting unit 8 detects the detection position 2a-P as a tip leading-end position (position 5Ea) in the X-axis direction, and further detects a tip leading-end position (position 5Eb) in the detection position 2b-P as the Y-axis direction. Furthermore, the control detecting unit 8 detects a position of the reference region R1 or a position of the reference region R2 in the up-and-down direction as a tip leading-end position (position 5Ec) in the up-and-down direction.

Figure 7:
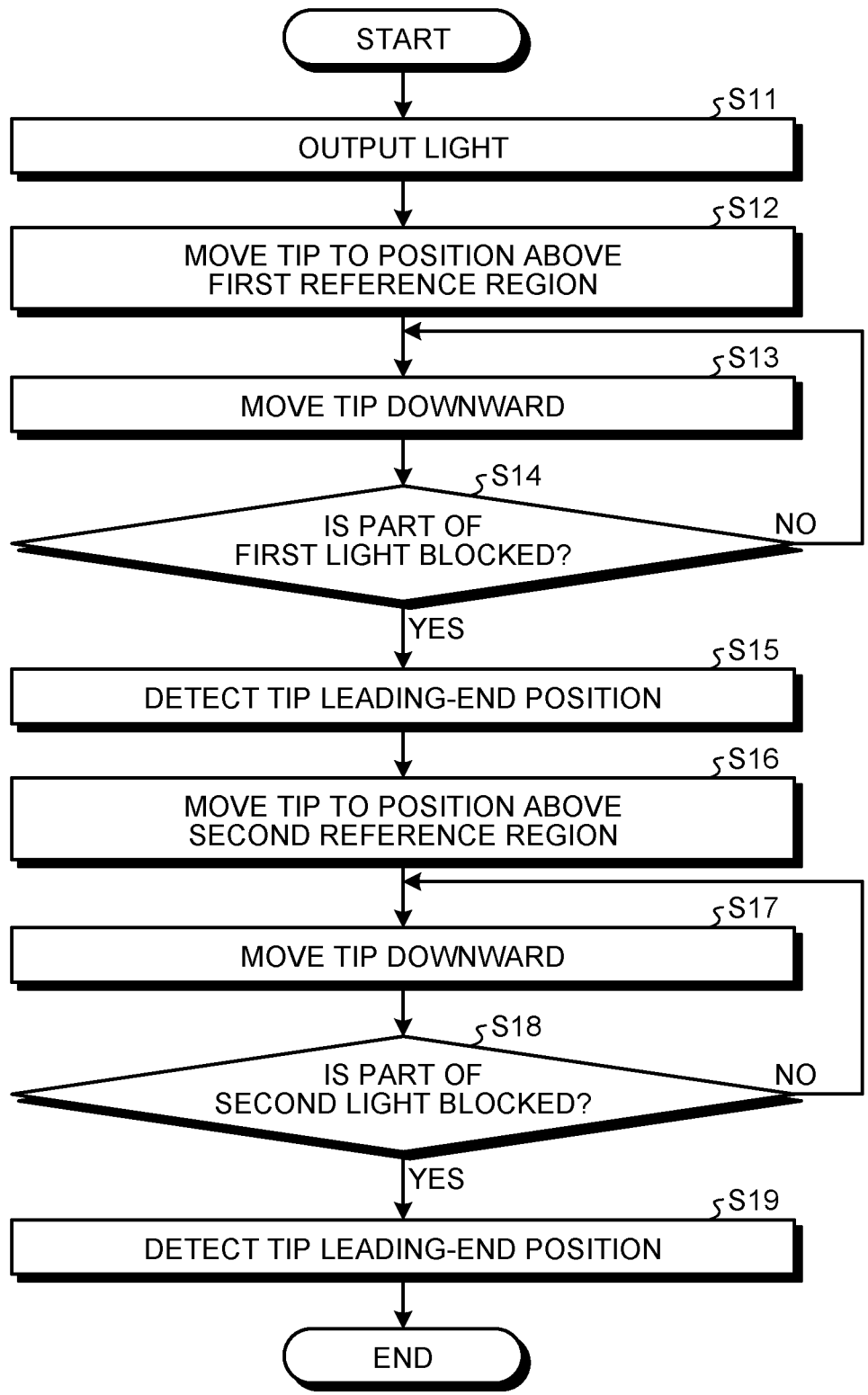
FIG. 7 is a flowchart illustrating an example of a process (detection method) to be executed in the detection device.

FIG. 7 is a flowchart illustrating an example of a process (detection method) to be executed in the detection device. Except for a case where explanation is especially given, the processes are executed under control and the like of the control detecting unit 8.

In Step S11, the detection device 50 outputs light. The light source 1 outputs the light 3. The detector 2 detects the light 3.

In Step S12, the detection device 50 moves a tip to a position above the first reference region. For example, the movement mechanism 7 moves the tip 5 such that the cell operating unit 6 is positioned above the reference region R1 by a predetermined distance (so as to be positioned at first reference position).

Note that the order of the above-mentioned Step S11 and Step S12 may be reversed one.

In Step S13, the detection device 50 moves a tip downward. The movement mechanism 7 moves the tip 5 downward by a predetermined interval.

In Step S14, the detection device 50 determines whether a part of the first light is blocked or not. If the control detecting unit 8 detects that a part of the light 3a is blocked by the leading end 5E, a part of the first light is determined to be blocked. In a case where a part of the first light is blocked (Step S14: Yes), the processing is shifted to Step S15. Otherwise (Step S14: No), the processing returns to Step S13. The movement mechanism 7 moves the tip 5 downward until the leading end 5E is in the reference region R and a part of the light 3a is blocked by the leading end 5E.

In Step S15, the detection device 50 detects a tip leading-end position. The control detecting unit 8 detects the detection position 2a-P in the detector 2 as the position 5Ea. The control detecting unit 8 detects a position of the reference region R1 in the up-and-down direction as the position 5Ec.

In Step S16, the detection device 50 moves a tip to a position above the second reference region. For example, the movement mechanism 7 moves the tip 5 such that the cell operating unit 6 is positioned above the reference region R2 by a predetermined distance (so as to be positioned in second reference position).

In Step S17, the detection device 50 moves a tip downward. The movement mechanism 7 moves the tip 5 downward by a predetermined interval.

In Step S18, the detection device 50 determines whether or not a part of the second light is blocked. If the control detecting unit 8 detects that a part of the light 3b is blocked by the leading end 5E, a part of the second light is determined to be blocked. In a case where a part of the second light is blocked (Step S18: Yes), the processing is shifted to Step S19. Otherwise (Step S18: No), the processing returns to Step S17. The movement mechanism 7 does not quit downward movement of the tip 5 until the leading end 5E is in the reference region R2 and a part of the light 3b is blocked by the leading end 5E.

In Step S19, the detection device 50 detects a tip leading-end position. The control detecting unit 8 detects the detection position 2b-P in the detector 2 as the position 5Eb.

For example, as described above, a tip leading-end position in the reference region R1 and a tip leading-end position in the reference region R2 are individually detected. Similar to the first embodiment, a wide-range detection is possible. It is sufficient that the single light source 1 and the single detector 2 are provided, so that it is possible to realize the detection device 50 that is more compact and with lower cost than that according to the first embodiment. In a case where the detection device 50 is installed in another device (for example, cell operating system to be mentioned later illustrated in FIG. 10), the same advantages can be provided to the installed other device.

Modifications of Second Embodiment

Some modifications of the second embodiment will be explained. Modification similar to those of the first embodiment is possible in a consistent range. Details thereof have been already explained, and thus duplicated explanation is appropriately omitted.

Processes of the above-mentioned Step S15 to Step S17 may be omitted. In this case, the movement mechanism 7 moves the tip 5 to the reference region R2 while maintaining a position in the up-and-down direction when light is blocked in Step S14. In Step S18, light is immediately determined to be blocked (Step S18: Yes). There presents no need for repeating processes of Step S17 and Step S18, so that it is possible to shorten a time interval needed for detecting a tip leading-end position.

Arrangement of the light source 1, the detector 2, and the mirror 4 is not limited to the example illustrated in FIG. 4. Various arrangements may be employed in which the mirror 4 reflects the light 3 emitted from the light source 1 toward the detector 2 to obtain the reference region R1 and the reference region R2.

If a relative position between the mirror 4 and the leading end 5E of the tip 5 is changed, the reference region R1 and the reference region R2 may be positioned in the same region. Detection of a tip leading-end position with the use of movement of the mirror 4 will be explained with reference to FIGS. 8 and 9.

Figure 8:
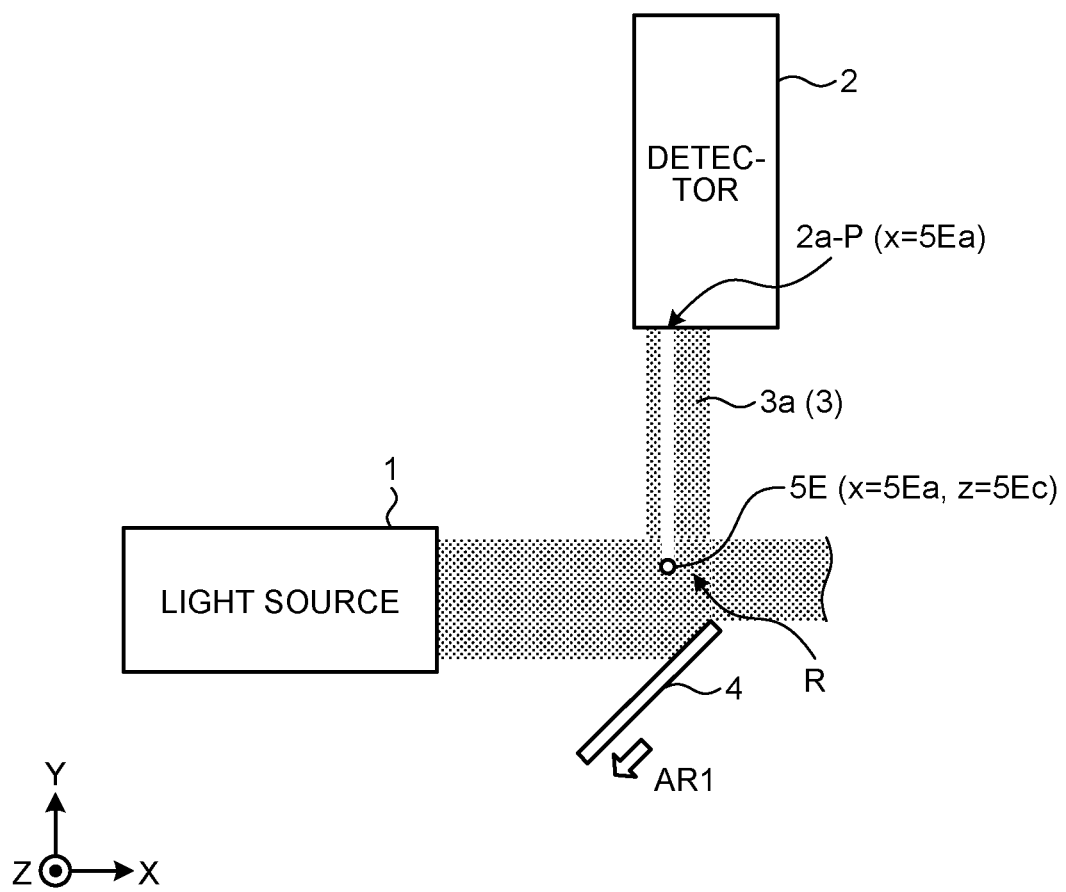
FIG. 8 is a diagram illustrating another example of detection of a tip leading-end position.
Figure 9:
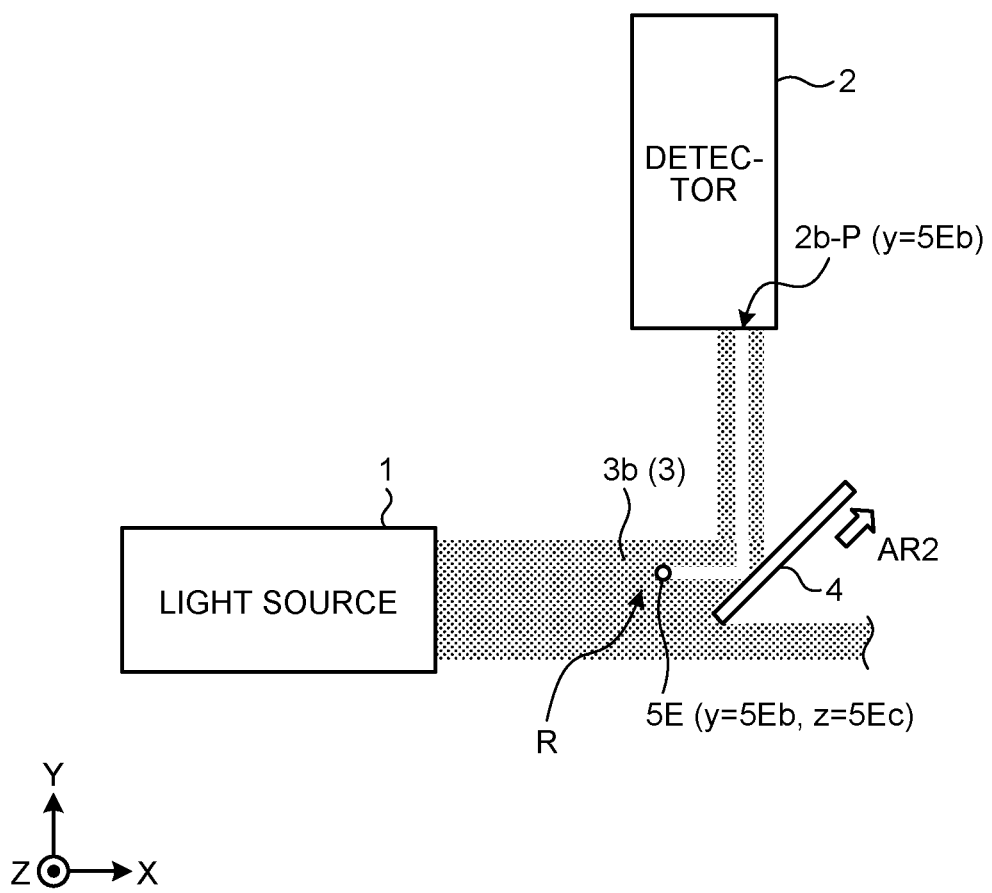
FIG. 9 is a diagram illustrating another example of detection of a tip leading-end position.

FIGS. 8 and 9 are diagrams illustrating other examples of detection of a tip leading-end position. The mirror 4 moves such that both the light 3a and the light 3b pass through the same region. The above-mentioned region becomes the reference region R. As illustrated in FIG. 8, the mirror 4 moves (see arrow AR1) to a position in which a part of light emitted from the light source 1 is reflected so as to pass through the reference region R. Light after the reflection is the light 3a. Furthermore, as illustrated in FIG. 9, the mirror 4 moves (arrow AR2) to a position in which a part of light having passed through the reference region R is reflected. Light before the reflection is the light 3b.

The movement mechanism 7 moves the tip 5 such that the leading end 5E is positioned in the reference region R. The mirror 4 is moved by a not-illustrated movement mechanism (driving apparatus and the like), for example. In a state where the mirror 4 is moved as illustrated in FIG. 8, the position 5Ea and the position 5Ec are detectable. In a state where the mirror 4 is moved as illustrated in FIG. 9, the position 5Eb and the position 5Ec are detectable.

For example, the mirror 4 is moved as described above, a tip leading-end position can be detected by using the same reference region R. Note that the light source 1, the detector 2, and the mirror 4, not only the mirror 4, (namely, whole detection unit 60) may be moved.

Third Embodiment

The detection device 50 as described above is installed in a cell operating system, for example. An example of the cell operating system is such a cell aspirating system as disclosed in Japanese Patent No. 6090387.

Figure 10:
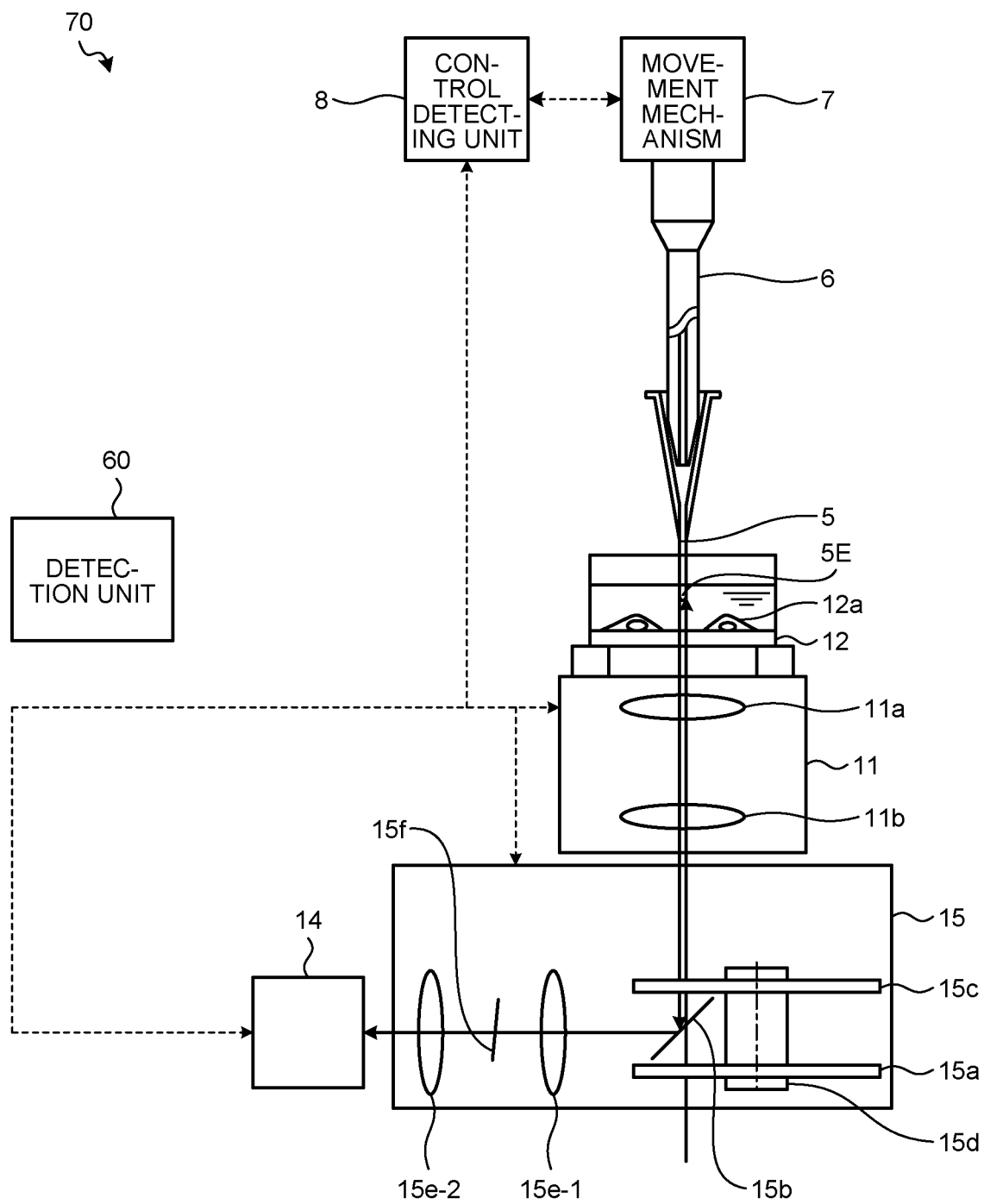
FIG. 10 is a diagram illustrating a schematic configuration example of a cell operating system.
Figure 11:
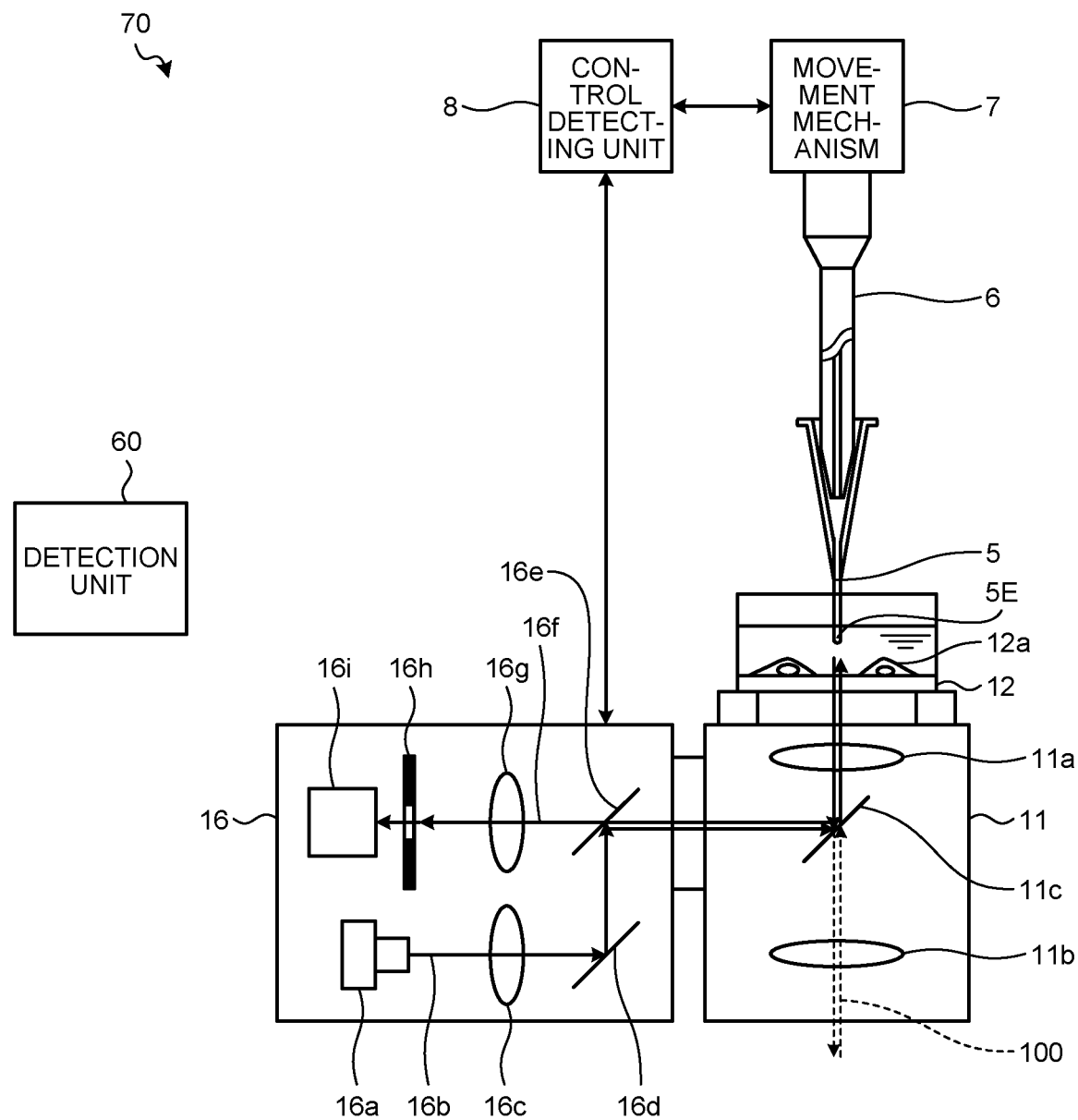
FIG. 11 is a diagram illustrating a schematic configuration example of a cell operating system.
Figure 12:
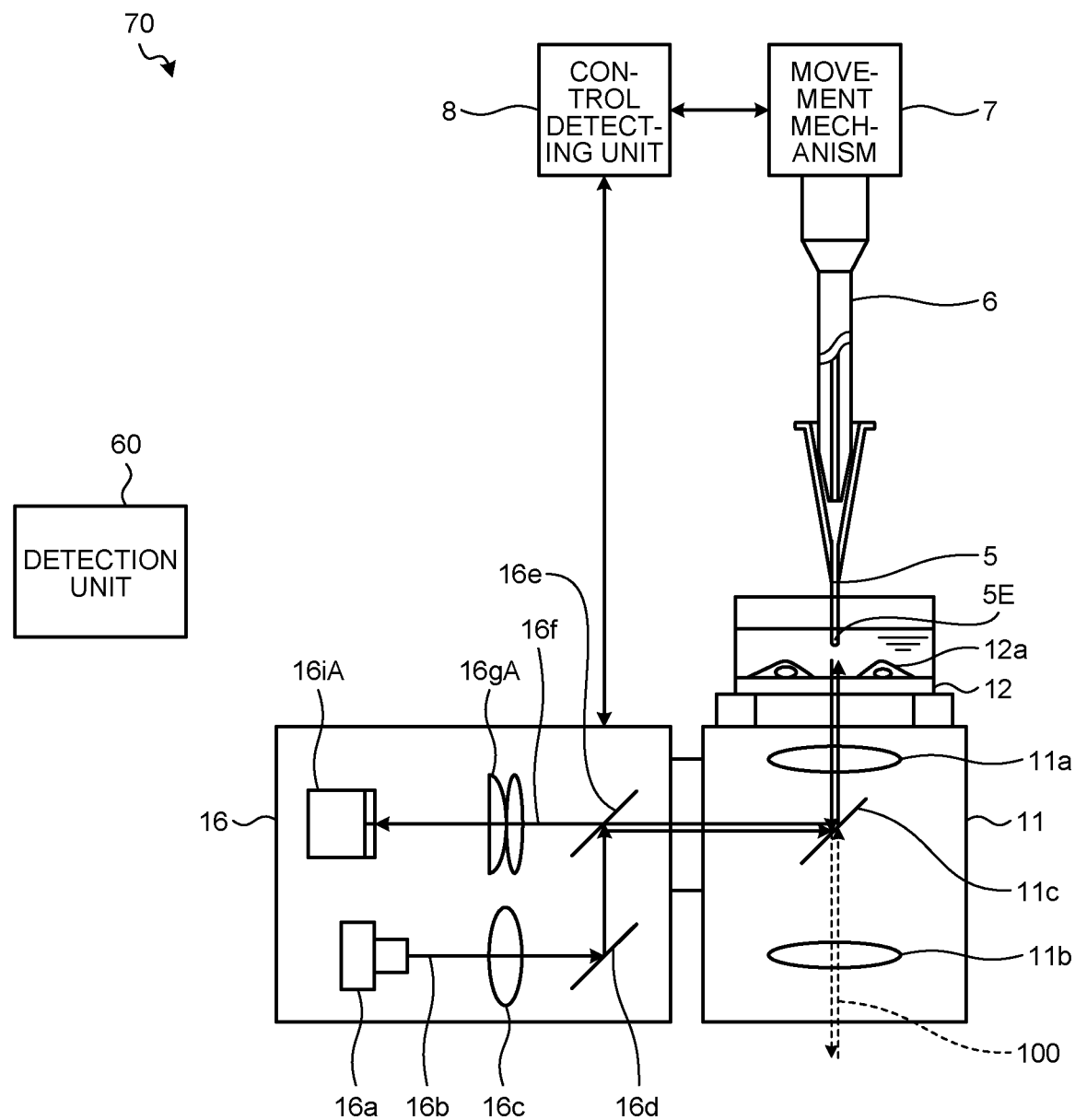
FIG. 12 is a diagram illustrating a schematic configuration example of a cell operating system.

FIGS. 10 to 12 are diagrams illustrating schematic configuration examples of cell operating systems. With reference to FIG. 10, a cell operating system 70 includes elements of the detection device 50 (see FIG. 1 and the like) having been already explained, namely, the detection unit 60, the movement mechanism 7, the control detecting unit 8, and the like. In the cell operating system 70, the control detecting unit 8 controls elements of the cell operating system 70 so as to execute overall control on the cell operating system 70. Some of signal lines for transmitting/receiving a control signal and the like are schematically illustrated.

The container 12 stores therein a cell 12a. The cell 12a may be a cell group constituted of a plurality of cells. A specific cell, an intracellular material, or the like is an operation target. Positional alignment between the leading end 5E and an operation target is executed so as to execute an operation on the operation target. Positional alignment during operation may be executed by moving a stage that supports the container 12, or may be executed by moving the tip 5.

In order to detect a tip leading-end position with high accuracy, a microscope 11 is used. In the present example, the microscope 11 is arranged on a side (Z-axis negative direction side) opposite to the container 12 while interposing the tip 5 therebetween, and observes the leading end 5E from below. The microscope 11 constitutes a confocal microscopic system along with a confocal scanner 15 and a camera 14.

The microscope 11 includes an object lens 11a and an imaging lens 11b. The confocal scanner 15 includes a pinhole array disk 15c, a dichromic mirror 15b, a microlens array disk 15a, a shaft 15d, a relay lens 15e-1, a bandpass filter 15f, and a relay lens 15e-2. The pinhole array disk 15c and the microlens array disk 15a are capable of coaxially rotating by the shaft 15d. An image of light at a focus is formed by the pinhole array disk 15c, and is reflected from the dichromic mirror 15b. The leading end 5E is captured by the camera 14 via the relay lens 15e-1, the bandpass filter 15f, and the relay lens 15e-2. A position of the leading end 5E in the captured image corresponds to a tip leading-end position in the lateral direction (X-Y plane direction). The image is transmitted from the camera 14 to the control detecting unit 8.

On the basis of the image, the control detecting unit 8 detects a tip leading-end position in the lateral direction. The image is an enlarged image obtained by enlarged observation using the object lens 11a of the microscope 11 and the like, and thus positional detection is possible with high accuracy in the order of magnitude of a few hundred nanometers, for example.

The control detecting unit 8 controls the movement mechanism 7 to move the tip 5 in the up-and-down direction such that the contrast of an image is the maximum. When the leading end 5E is positioned in a confocal position, the contrast is the maximum. The control detecting unit 8 detects a confocal position as a tip leading-end position in the up-and-down direction. Positional detection with high accuracy is possible, which is approximately equal to a confocal resolution.

Positional detection is also possible by using configurations illustrated in FIGS. 11 and 12. In FIG. 11, the microscope 11 and a position sensor 16 are exemplified as configuration elements of a confocal microscopic system. In the microscope 11, a dichromic mirror 11c is arranged between the object lens 11a and the imaging lens 11b.

The position sensor 16 includes a light source 16a, a lens 16c, a mirror 16d, a beam splitter 16e, a condensing lens 16g, a pinhole 16h, and a light-receptive sensor 16i. The light source 16a is arranged at a focus of the lens 16c so as to output laser light 16b toward the lens 16c. The lens 16c collimates the laser light 16b emitted from the light source 16a into parallel light (irradiation light). The irradiation light passes through the beam splitter 16e (for example, half mirror), is reflected by the dichromic mirror 11c of the microscope 11, and illuminates the leading end 5E via the object lens 11a.

Light (reflected light) from the leading end 5E is reflected by the dichromic mirror 11c via the object lens 11a of the microscope 11 so as to pass through the beam splitter 16e of the position sensor 16. Passed light is illustrated as reflected light 16f. The reflected light 16f is focused by the condensing lens 16g. The pinhole 16h is arranged at a focal position of the condensing lens 16g, and causes light on a focus of the object lens 11a to pass therethrough. A confocal optical system is constituted. Light having passed through the pinhole 16h is detected by the light-receptive sensor 16i. Note that each of dashed-line arrows 100 in the drawings indicates light that lights the cell 12a and light that is reflected by the cell 12a.

Information on a received light amount of the light-receptive sensor 16i is transmitted from the light-receptive sensor 16i to the control detecting unit 8. The control detecting unit 8 controls the movement mechanism 7 to move the tip 5 in the up-and-down direction such that a received light amount is the maximum. In a case where the leading end 5E is positioned in a focal position of the object lens 11a, the received light amount is the maximum. The control detecting unit 8 detects a focal position of the object lens 11a as a tip leading-end position in the up-and-down direction. Positional detection with high accuracy is possible, which is approximately equal to a confocal resolution.

Compared with the position sensor 16 exemplified in FIG. 11, the position sensor 16 exemplified in FIG. 12 is different therefrom in including a cylindrical lens 16gA and a light-receptive sensor 16iA instead of the condensing lens 16g and the light-receptive sensor 16i, and further not including the pinhole 16h. The cylindrical lens 16gA is used, and thus the pinhole 16h becomes unnecessary. A four-split PD is employed for the light-receptive sensor 16iA, for example.

The above-mentioned configuration of the cell operating system 70 is merely one example. Various configurations for detecting a tip leading-end position with the use of the microscope 11 may be employed. Positional alignment between the leading end 5E and an operation target is executed on the basis of observation result of the microscope 11, in other words, a tip leading-end position detected by a confocal microscopic system with high accuracy, and further an operation for an operation target is executed.

As described above, a tip leading-end position in the lateral direction (X-Y plane direction) is detected on the basis of an image captured by the camera 14. The image capturing element of the camera 14 is rectangular-shaped having a side of up to approximately 15 mm to 20 mm from a view point of a general field number of a biological microscope. A magnification of the object lens 11a in the microscope 11 is approximately 40 magnifications, for example. In this case, a detection range of an image is only a square range having a side of up to 500 μm, and thus it is difficult to cover a fluctuation width (up to 1000 μm) of a tip leading-end position. There presents possibility that the no leading end 5E may be included in an image so as to make positional detection impossible.

In order to realize a wide-range detection, a method may be employed for changing a magnification of the object lens 11a in two steps of a low magnification (for example, 10 magnifications) and a high magnification (for example, 40 magnifications). In this case, two-step detection is necessary, and a time interval needed for the detection becomes long. If the above-mentioned detection of a tip leading-end position according to the first embodiment and the second embodiment is executed, it is possible to shorten a time interval needed for the detection.

The control detecting unit 8 detects a tip leading-end position by using the detection unit 60 and the like. Details thereof has been already explained, and thus duplicated explanation is omitted. A detected tip leading-end position may be grasped by using a coordinate in the cell operating system 70 and the like. On the basis of the above-mentioned detection result, the control detecting unit 8 controls the movement mechanism 7 to move the tip 5 such that the leading end 5E is positioned in an observation range of the microscope 11. Thus, the leading end 5E is reliably included in an image captured by the camera 14. On the basis of the image, a tip leading-end position is detected with higher accuracy. On the basis of the detection result, positional alignment between the leading end 5E and an operation target is executed so as to execute an operation on the operation target.

FIG. 13 is a flowchart illustrating examples of processes (detection method, cell operating method) to be executed in the cell operating system. Except for a case where explanation is especially given, the processes are controlled by the control detecting unit 8 and the like.

In Step S21, the cell operating system 70 detects a tip leading-end position by using a detection unit. As described above, the control detecting unit 8 detects a tip leading-end position on the basis of detection result of the detector 2.

In Step S22, the cell operating system 70 moves the tip 5 into an observation range of a microscope. On the basis of detection result in Step S21, the movement mechanism 7 moves the tip 5 such that the leading end 5E is positioned in an observation range of the microscope 11.

In Step S23, on the basis of the observation result of the microscope, the cell operating system 70 detects a tip leading-end position. The control detecting unit 8 detects a tip leading-end position with higher accuracy on the basis of the above-mentioned image obtained via the microscope 11 and the like, for example.

In Step S24, the cell operating system 70 executes positional alignment between the tip leading end and the operation target. On the basis of detection result in Step S23, the control detecting unit 8 controls a driving apparatus (not-illustrated) to move a stage that supports the container 12 such that the leading end 5E is positioned at the operation target, for example.

In Step S25, the cell operating system 70 executes an operation on an operation target. The control detecting unit 8 controls the cell operating unit 6 such that aspiration and the like are executed on a cell, an intracellular material, or the like in the cell 12a via the leading end 5E.

For example, as described above, a cell operation is executed. Caused by detection of a tip leading-end position in a wide range (for example, approximately 1 mm to a few ten mm) with the use of the detection unit 60, the tip leading-end position can be reliably detected even in a case where the tip leading-end position fluctuates particularly in the lateral direction. Moreover, caused by detection of a tip leading-end position with high accuracy (for example, approximately a few hundred nm) with the use of the microscope 11, positional alignment with high accuracy is possible. For example, positional alignment is also possible with respect to a very small operation target such as an organelle in the cell 12a.

The technology explained above is specified as described below, for example. One of disclosed technologies is a detection device. As described above with reference to FIGS. 1 to 9 and the like, the detection device 50 is a detection device that detects a position of the leading end 5E of the tip 5 including the leading end 5E in a lower portion thereof (Z-axis negative direction) and executing an operation on a cell (for example, cell 12a illustrated in FIG. 10) via the leading end 5E. The detection device 50 includes the light source 1, the movement mechanism 7, and the detector 2. The light source 1 outputs the light 3 in the lateral direction (X-Y plane direction) such that the light has a width when viewed along the up-and-down direction (Z-axis direction). The movement mechanism 7 moves the tip 5. The detector 2 detects the light 3 output from the light source 1. The light 3 output from the light source 1 until being detected by the detector 2 includes the light 3a (first light) and the light 3b (second light) that advance in respective lateral directions (for example, Y-axis direction and X-axis direction) that are different from each other. The movement mechanism 7 moves the tip 5 such that a part of the light 3a and a part of the light 3b are blocked by the leading end 5E. The detector 2 detects the light 3a and the light 3b whose parts are blocked by the leading end 5E.

According to the above-mentioned detection device 50, the light 3a and the light 3b whose parts are blocked by the leading end 5E are detected, so that it is possible to detect tip leading-end positions in the width direction of the light 3a and the width direction of the light 3b. It is possible to execute positional detection in a wide range in accordance with widths of the light 3a and the light 3b.

The detector 2 may detect (i) a position in which a light intensity is small, the light intensity being detected in the width direction of the light 3a whose part is blocked by the leading end 5E and (ii) a position in which a light intensity is small, the light intensity being detected in a width direction of the light 3b whose part is blocked by the leading end 5E. For example, as described above, a tip leading-end position in a width direction of the light 3a and a tip leading-end position in a width direction of the light 3b can be detected.

As described above with reference to FIGS. 1 to 3 and the like, the light source 1 includes: the light source 1a (first light source) that outputs the light 3a; and the light source 1b (second light source) that outputs the light 3b that intersects with the light 3a, the detector 2 includes: the detector 2a (first detector) that detects the light 3a whose part is blocked by the leading end 5E; and the detector 2b (second detector) that detects the light 3b whose part is blocked by the leading end 5E, and the movement mechanism 7 moves the tip 5 such that the leading end 5E is positioned in the reference region R where the light 3a and the light 3b intersect with each other. For example, as described above, the light 3a and the light 3b can be obtained, and further the light 3a and the light 3b whose parts are blocked by the leading end 5E can be detected.

As described above with reference to FIGS. 4 to 7 and the like, the detection device 50 further includes: the mirror 4 that reflects the light 3 from the light source 1 toward the detector 2, wherein one of the light 3a and the light 3b may be light directing from the light source 1 to the mirror 4, and another of the light 3a and the light 3b may be light directing from the mirror 4 to the detector 2. In this case, the detector 2 may detect, at different timings, the light 3a whose part is blocked by the leading end 5E and the light 3b whose part is blocked by the leading end 5E. For example, as described above, the light 3a and the light 3b can be obtained, and further the light 3a and the light 3b whose parts are blocked by the leading end 5E can be detected. It is sufficient that the single light source 1 and the single detector 2 are provided, so that it is possible to realize the detection device 50 that is more compact with low cost.

As described above with reference to FIGS. 8 and 9 and the like, the mirror 4 moves such that the light 3a and the light 3b pass through the same reference region R, and the movement mechanism 7 moves the tip 5 such that the leading end 5E is positioned in the same reference region R. Thus, a tip leading-end position can be detected by using the same reference region R.

A width of the light 3a is larger than a fluctuation width of a position of the leading end 5E in a direction (for example, Y-axis direction) of the width, and a width of the light 3b is larger than a fluctuation width of a position of the leading end 5E in a direction (for example, X-axis direction) of the width. Thus, it is possible to execute positional detection in a wide range that covers a fluctuation range of a tip leading-end position.

Each of the light 3a and the light 3b has a corresponding width in the up-and-down direction (Z-axis direction), the width (up-and-down width) of the light 3a in the up-and-down direction is larger than a fluctuation width of a position of the leading end 5E in the width of the light 3a (in Z-axis direction), and the width (up-and-down width) of the light 3b in the up-and-down direction is larger than a fluctuation width of a position of the leading end 5E in the width of the light 3b (in Z-axis direction). In accordance with a principle similar to that of detection of a tip leading-end position in the lateral direction (X-Y plane direction), it is possible to detect a tip leading-end position in the up-and-down direction (Z-axis direction).

As described above with reference to FIGS. 10 to 13 and the like, the detection device 50 is installed in the cell operating system 70, and in the cell operating system 70, positional alignment is executed between the leading end 5E and an operation target in the cell 12a, based on a detection result of the detector 2. For example, as described above, it is possible to effectively use detection result of a tip leading-end position.

The movement mechanism 7 moves the tip 5 based on the detection result of the detector 2 such that the leading end 5E is positioned in an observation range of the microscope 11, and in the cell operating system 70, the positional alignment is executed based on an observation result of the leading end 5E by the microscope 11. A tip leading-end position detected in a wide range is detected with high accuracy by the microscope 11, so that positional alignment with high accuracy is possible.

The detection method explained with reference to FIGS. 3 and 7 and the like is also one of the disclosed technologies. The detection method is a method for detecting a position of the leading end 5E of the tip 5 for executing an operation on a cell (for example, cell 12a illustrated in FIG. 10) via the leading end 5E, the tip 5 including the leading end 5E in a lower portion thereof (Z-axis negative direction). The detection method includes: outputting (Step S1 and Step S11) the light 3 in the horizontal direction (X-Y plane direction) such that the light 3 has a width when viewed along the up-and-down direction (Z-axis direction); moving the tip 5 (Step S3, Step S13, and Step S17); and detecting the output light 3 (Step S4, Step S14, and Step S18). The light 3 from the outputting until the detecting includes the light 3a (first light) and the light 3b (second light) that advance in respective lateral directions (for example, Y-axis direction and X-axis direction) that are different from each other. The moving includes moving the tip 5 such that a part of the light 3a and a part of the light 3b are blocked by the leading end 5E (Step S3, Step S4, Step S13, Step S14, Step S17, and Step S18). The detecting includes detecting the light 3a and the light 3b whose parts are blocked by the leading end 5E (Step S4, Step S14, and Step S18). In accordance with the above-mentioned detection method, as described above, positional detection in a wide range in accordance with a width of the light 3a and a width of the light 3b is possible.

What is claimed is:

1. A detection device that detects a position of a leading end of a tip for executing an operation on a cell via the leading end, the tip including the leading end in a lower portion thereof, the detection device comprising:

a light source that outputs light in a lateral direction such that the light has a width when viewed along an up-and-down direction;
a movement mechanism that moves the tip; and
a detector that detects the light output from the light source, wherein
the light output from the light source until being detected by the detector includes first light and second light that advance in respective lateral directions that are different from each other,
the movement mechanism moves the tip such that a part of the first light and a part of the second light are blocked by the leading end and such that the leading end is positioned in a width of the first light and in a width of the second light at respective different timings,
the width of the first light is larger than a fluctuation width of a position of the leading end in a direction of the width of the first light,
the width of the second light is larger than a fluctuation width of a position of the leading end in a direction of the width of the second light,
the detection device further comprises a mirror that reflects light from the light source toward the detector, the first light is light directing from the light source to the mirror, and the second light is light directing from the mirror to the detector, and
the detector detects the first light whose part is blocked by the leading end and the second light whose part is blocked by the leading end.

2. The detection device according to claim 1, wherein the detector detects (i) a first detection position in which a light intensity changes, the light intensity being detected in a width direction of the first light whose part is blocked by the leading end and (ii) a second detection position in which a light intensity changes, the light intensity being detected in a width direction of the second light whose part is blocked by the leading end.

3. The detection device according to claim 2, further comprising a control detecting unit that detects the first detection position as a position of the leading end of the tip in a first lateral direction, and the second detection position as a position of the leading end of the tip in a second lateral direction.

4. The detection device according to claim 1, wherein the detector detects, at different timings, the first light whose part is blocked by the leading end and the second light whose part is blocked by the leading end.

5. The detection device according to claim 1, wherein each of the first light and the second light has a corresponding width in the up-and-down direction,
the width of the first light in the up-and-down direction is larger than a fluctuation width of a position of the leading end in the width of the first light, and
the width of the second light in the up-and-down direction is larger than a fluctuation width of the position of the leading end in the width of the second light.

6. The detection device according to claim 1, wherein the detection device is installed in a cell operating system, and
in the cell operating system, positional alignment is executed between the leading end and an operation target in the cell, based on a detection result of the detector.

7. The detection device according to claim 6, wherein the movement mechanism moves the tip based on the detection result of the detector such that the leading end is positioned in an observation range of a microscope, and in the cell operating system, the positional alignment is executed based on an observation result of the leading end by the microscope.

8. The detection device according to claim 1, wherein the first light is light before being reflected by the mirror, and the second light is light after being reflected by the mirror.

9. The detection device according to claim 1, wherein a total number of the light source in the detection device is one, and a total number of the detector in the detection device is one.

10. The detection device according to claim 1, wherein the fluctuation width of the position of the leading end in the direction of the width of the first light and the fluctuation width of the position of the leading end in the direction of the width of the second light are due to fluctuation in manufacturing and/or attaching of the tip.

11. A detection method for detecting a position of a leading end of a tip for executing an operation on a cell via the leading end, the tip including the leading end in a lower portion thereof, the detection method comprising:

outputting light from a light source in a lateral direction such that the light has a width when viewed along an up-and-down direction;

moving the tip; and detecting the output light by a detector, wherein light from the outputting until the detecting includes first light and second light that advance in respective lateral directions that are different from each other, the moving includes moving the tip such that a part of the first light and a part of the second light are blocked by the leading end and such that the leading end is positioned in a width of the first light and in a width of the second light at respective different timings, the width of the first light is larger than a fluctuation width of a position of the leading end in a direction of the width of the first light, the width of the second light is larger than a fluctuation width of a position of the leading end in a direction of the width of the second light, the method further comprises reflecting light from the light source toward the detector by a mirror, the first light is light directing from the light source to the mirror, and the second light is light directing from the mirror to the detector, and the detecting includes detecting the first light whose part is blocked by the leading end and the second light whose part is blocked by the leading end.

12. The detection method according to claim 11, wherein the first light is light before being reflected by the mirror, and the second light is light after being reflected by the mirror.

13. The detection method according to claim 11, wherein the detecting includes detecting (i) a first detection position in which a light intensity changes, the light intensity being detected in a width direction of the first light whose part is blocked by the leading end and (ii) a second detection position in which a light intensity changes, the light intensity being detected in a width direction of the second light whose part is blocked by the leading end, and the detection method further comprises detecting the first detection position as a position of the leading end of the tip in a first lateral direction, and the second detection position as a position of the leading end of the tip in a second lateral direction.

14. The detection method according to claim 11, wherein the detection method is performed by a detection device comprising the light source, the mirror and the detector, and a total number of the light source in the detection device is one, and a total number of the detector in the detection device is one.

15. The detection method according to claim 11, wherein the fluctuation width of the position of the leading end in the direction of the width of the first light and the fluctuation width of the position of the leading end in the direction of the width of the second light are due to fluctuation in manufacturing and/or attaching of the tip.

* * * * *